March 7, 1939.    J. MACGREGOR    2,149,684
SHIP'S HATCH COVER
Filed March 3, 1937
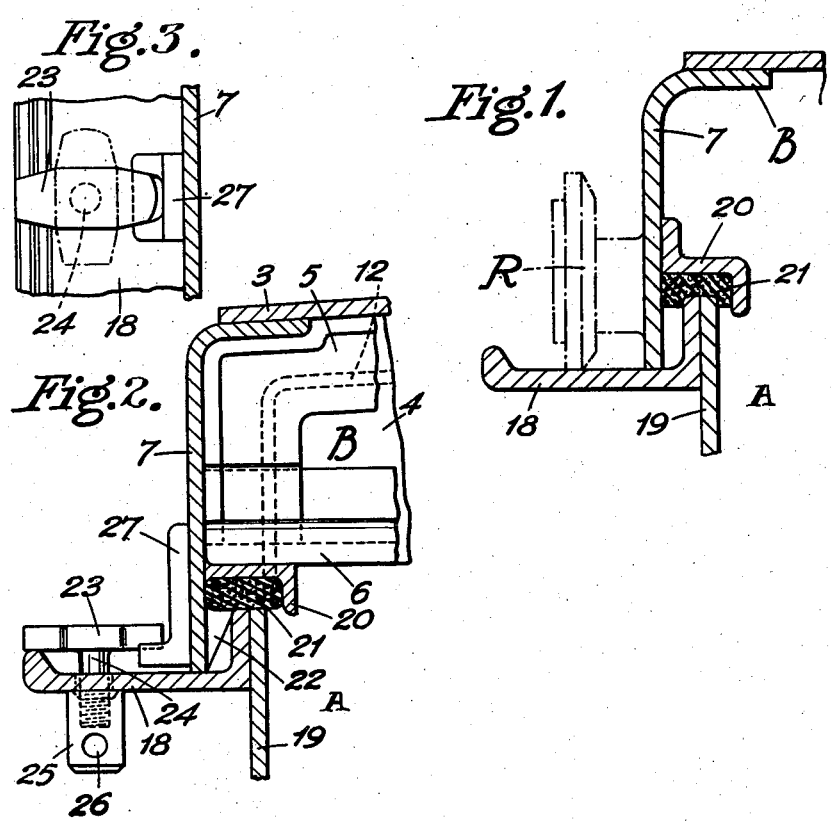
INVENTOR. Joseph MacGregor
By D. P. Wolhaupter
his attorney.

Patented Mar. 7, 1939

2,149,684

UNITED STATES PATENT OFFICE 2,149,684

SHIP'S HATCH COVER

Joseph Macgregor, Whitley Bay, England

Application March 3, 1937, Serial No. 128,854

5 Claims. (Cl. 114—201)

This invention relates to ships' hatches having steel hatch covers and has for its object to provide watertight jointing between a cover element and an adjacent structure.

According to the invention, ships' hatches include a cover element constructed to make an outer metal to metal joint and an inner resilient packing joint with an adjacent structure, the arrangement being such that pressure is exerted on the faces of the metal to metal joint to cause them to abut tightly, and to compress the resilient packing joint to a degree limited by the metal to metal joint. The pressure is exerted by a clamping device when the joint is made by bringing the parts together in a horizontal direction, but when the parts are brought together in a vertical direction, the clamping device may be omitted and the pressure exerted solely by the weight of the cover. In any event, at various points on the covers, possibly away from the joints, clamping devices are provided to secure the covers down on to the coaming, and these would naturally augment the pressure due to the cover's weight.

The cover element herein referred to may comprise a single piece hatch cover or an independent section of a multi-piece hatch cover and the jointing may be formed between the edge of the cover element and the coaming, or between adjacent edges of two adjoining independent cover sections.

The invention is illustrated by way of example in the accompanying drawing, wherein:

Figure 1 is a section of the joint made in a vertical direction between a cover and the coaming;

Figure 2 shows a joint similar to Figure 1 combined with clamping means;

Figure 3 is a plan of the clamp seen in Figure 2.

Referring generally to the drawing, the cover sections between which a watertight joint is to be formed are generally indicated by the references A and B. Section A includes the seat 18 coaming 19 and other parts later to be described. Section B is composed of an outer skin plate 3, web 4, angle girder 5 and bulb angle 6, the side plate 7 of section B being more clearly shown in Fig. 2.

In Figures 1 and 2, the metal to metal joint between a cover element B and the coaming is formed by the bottom edge of the cover side plate 7 and the upper face of the horizontal limb of an angle plate 18 welded to the outer side of the coaming plate 19, it being particularly noted that said horizontal limb of the bulb angle 18 is located under the upper edge of the coaming plate 19. An inner resilient packing joint is formed by a packing strip 21 held in position on the cover element by an angle 20 welded thereto. Spaced triangular webs 22 may be fixed as in Fig. 2 to the inner side of the plate 7 at the lower edge thereof, said webs serving as a guide means for the cover element when same is being placed in position. In Fig. 1 is shown a roller R for the cover, and this may take any suitable form. For example, it may be mounted on an eccentric bush whereby partial rotation may raise or lower the cover on the angle 18. No clamp is shown in Fig. 1, but in Fig. 2 a clamping means adapted to clamp the cover on to its support comprises a cleat 23 having a downwardly extending threaded stem 24 passing through a hole in the angle 18, a nut block 25 having a hole 26 for a tommy bar being screwed on the stem 24 at the underside of the ledge 18. The cleat 23 is adapted to rest with one end on the upstanding flange of the bulb angle ledge 18 and with the other end in a suitable recess of the lug 27 riveted or welded to the outer side of plate 7. For removing the cover the nut 25 is loosened sufficiently to allow the cleat 23 to be turned into the chain dotted position shown in Fig. 3, the clamping down of the cover being effected by the reverse operation, there being no necessity to remove the clamping device altogether.

I claim:

1. A hatch structure including, in combination, a hatch cover having a down-turned flange providing a bottom edge, a coaming, a seat below the upper edge of the coaming on which the bottom edge of the hatch cover rests, and a soft sealing member supported on the inside of the cover flange at a higher elevation than the said bottom edge thereof to yieldingly engage the top edge of the coaming and provide a compressed inner seal for the hatch structure.

2. A hatch structure including, in combination, a coaming, a metal seat surrounding the same, a metal cover including a down-turned flange of greater depth than the distance from the top of the coaming to the seat and having its lower edge in metal to metal contact with the seat, and a soft non-metallic compressible sealing member carried by the inside face of the cover flange and engaging the upper edge of the coaming to provide a water tight seal, the compression of said sealing member being limited by the metal to metal contact between the flange of the cover and said seat.

3. A hatch structure comprising a coaming, a seat outwardly of said coaming below the upper edge thereof, a hatch cover having a rigid side wall to rest at its bottom on said seat, and compressible packing material between the top of said coaming and a part of said hatch cover extending inwardly from the side wall thereof to provide an inner seal for the cover.

4. A hatch structure comprising a coaming, a seat outwardly of said coaming below the upper edge thereof, a hatch cover having a rigid side wall whose bottom edge rests on said seat, a member rigid with said side wall and extending inwardly therefrom, compressible packing material at the underside of said member and in sealing engagement with the upper edge of said coaming, and means for drawing said hatch cover downwardly to cause the bottom edge of its side wall to engage the seat and thereby limit the compression of said packing material.

5. A hatch structure comprising a coaming, a seat member rigid with said coaming extending outwardly therefrom below the top thereof, a hatch cover having a rigid side wall to rest at its bottom on said seat member, a channel forming member rigid with said side wall extending inwardly therefrom above the bottom thereof in overlying relationship to said coaming, a yielding packing material confined in the channel formed by said last mentioned member and in sealing engagement with the top of said coaming, and cooperating means on the seat member and cover for drawing said cover downwardly relative to said coaming.

JOSEPH MACGREGOR.